United States Patent [19]

Streck

[11] Patent Number: 4,856,049

[45] Date of Patent: Aug. 8, 1989

[54] SINGLE LINE COMPATIBLE FAX SYSTEM

[75] Inventor: Donald A. Streck, Ojai, Calif.

[73] Assignee: Jerry R. Iggulden, Newhall, Calif.; a part interest

[21] Appl. No.: 170,380

[22] Filed: Mar. 18, 1988

[51] Int. Cl.$^4$ .................. H04M 1/65; H04M 11/00
[52] U.S. Cl. ........................... 379/67; 379/82; 379/100
[58] Field of Search .............. 379/100, 98, 94, 93, 379/67, 82; 358/257

[56] References Cited

U.S. PATENT DOCUMENTS

| | | | |
|---|---|---|---|
| 4,623,758 | 11/1986 | Batla et al. | 379/80 |
| 4,639,553 | 1/1987 | Kiguchi | 379/377 |
| 4,677,660 | 6/1987 | Yoshida | 379/100 |
| 4,773,080 | 9/1988 | Nakajima et al. | 375/5 |

FOREIGN PATENT DOCUMENTS

| | | | |
|---|---|---|---|
| 3042885 | 5/1982 | Fed. Rep. of Germany | 379/100 |
| 3107271 | 9/1982 | Fed. Rep. of Germany | 379/100 |
| 0215163 | 12/1983 | Japan | 379/100 |
| 0025466 | 2/1984 | Japan | 379/98 |
| 0259058 | 12/1985 | Japan | 379/100 |
| 0198853 | 9/1986 | Japan | 379/100 |
| 0242449 | 10/1986 | Japan | 379/100 |

Primary Examiner—Thomas W. Brown
Attorney, Agent, or Firm—Donald A. Streck

[57] ABSTRACT

Apparatus for answering an incoming call over a single telephone line and for automatically switching the call between a telephone and a carrier signal-based device as appropriate. There is a three position switch for switching a telephone line connected thereto between first, second and third output positions thereof. The switch has the telephone operably connected to the second output position thereof and the carrier signal-based device connected to the third output position thereof. There is first logic having an input connected to the first output position of the switch and an output operably connected to switch the switch between the first, second and third output positions for answering an incoming call on the telephone line, for determining whether the incoming call is from a carrier signal-based device, for switching the switch to connect the second output position when an incoming call from a non-carrier signal-based device is detected, and for switching the switch to connect the third output position when an incoming call from a carrier signal-based device is detected. There is also second logic having an input connected to sense transmissions from the telephone and the carrier signal-based device and an output operably connected to switch the switch between the first, second and third output positions for switching the switch to the first position when a hang up by the telephone or the carrier signal-based device is detected. The preferred embodiment also senses a pickup by either device and automatically switches the switch to connect the device to the telephone line for outgoing transmission use. The preferred stand alone version also includes telephone answering capability for alerting a caller to its operation and for recording a message if the telephone is not answered.

24 Claims, 7 Drawing Sheets

SINGLE LINE COMPATIBLE FAX SYSTEM

BACKGROUND OF THE INVENTION:

The present invention relates to facsimile systems and, more particularly, to apparatus for answering an incoming call over a single telephone line and for automatically switching the call between a telephone and a carrier signal-based device as appropriate comprising, three position switch means for switching a telephone line connected thereto between first, second and third output positions thereof, the switch means having the telephone operably connected to the second output position thereof and the carrier signal-based device connected to the third output position thereof; first logic means having an input connected to the first output position of the switch means and an output operably connected to switch the switch means between the first, second and third output positions for answering an incoming call on the telephone line, for determining whether the incoming call is from a carrier signal-based device, for switching the switch to connect the second output position when an incoming call from a non-carrier signal-based device is detected, and for switching the switch to connect the third output position when an incoming call from a carrier signal-based device is detected; and, second logic means having an input connected to sense transmissions from the telephone and the carrier signal-based device and an output operably connected to switch the switch means between the first, second and third output positions for switching the switch to the first position when a hang up by the telephone or the carrier signal-based device is detected.

Figure 1:
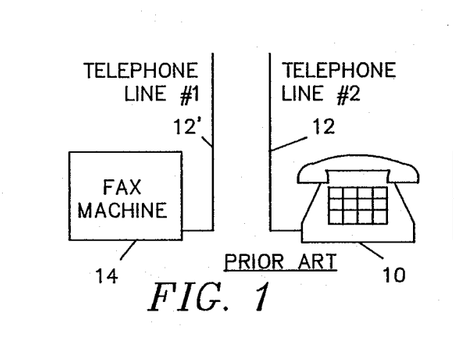
FIG. 1 is a simplified drawing showing the prior art technique of connecting a facsimile machine and a telephone at a common site to individual incoming telephone lines.

Facsimile (FAX) machines are rapidly growing in popularity as they become cheaper and cheaper. One of the target groups for future development and sales is the so-called "low end user", e.g. home offices, small businesses, and individuals for personal and business use. The preferred method for installation at a particular site is shown in FIG. 1 wherein the telephone 10 has one telephone line 12 connected to it and the FAX machine 14 has a second telephone line 12' connected to it. While this gives preferred operation for both the telephone 10 and the FAX machine 14 by preventing interference between the two devices, it is expensive for the low end user who may only use the FAX machine 14 occasionally and cannot justify the installation and monthly costs of a separate telephone line for the FAX machine. The same is true for other types of devices which employ telephone lines for data transmission, such as modems operating with computers.

Figure 2:
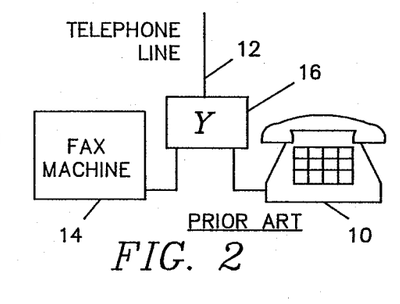
FIG. 2 is a simplified drawing showing the prior art technique of connecting a facsimile machine and a telephone at a common site to a single incoming telephone line through a Y connector.
Figure 3:
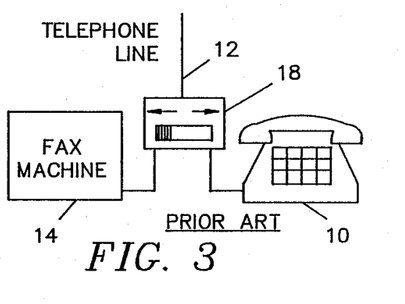
FIG. 3 is a simplified drawing showing the prior art technique of connecting a facsimile machine and a telephone at a common site to a single incoming telephone line through a switch.

In instances where the user does not wish to install a separate telephone line for the FAX machine, or the like, the typical prior art options are depicted in FIGS. 2 and 3. As shown in FIG. 2, the telephone 10 and FAX machine 14 are connected to a single telephone line 12 through a Y-connector 16 which places the two devices in parallel. Outgoing use of either the telephone 10 or FAX machine 14 is easy with this arrangement; however, the FAX machine 14, being automatic in its operation when turned on, will tend to grab all the incoming calls. For that reason, as shown in FIG. 3, the telephone 10 and FAX machine 14 are more commonly connected to a single telephone line 12 through a switch 18 which allows the user to select which of the devices is connected to the common telephone line 12 at any time. When the user wants to use the FAX machine 14 (and at night when unattended), it is switched to the telephone line 12. The rest of the time, the telephone 10 is connected through the switch 18. As can be appreciated, this arrangement has many shortcomings as well. If one wants to receive incoming FAX transmissions when out of the office, it is impossible to have a telephone answering machine to receive incoming telephone calls. Moreover, during the daytime when the office is attended and the switch 18 has the telephone 10 connected to the telephone line 12, anyone wishing to send a FAX transmission must first call on the telephone 10 and advise the user to switch to the FAX position.

Wherefore, it is the object of the present invention to provide a simple and easy modification for FAX machines and their method of operation which will allow telephones and FAX machines to actively share a common telephone line with the proper device answering incoming calls.

It is another object of the present invention to provide a simple and easy modification for FAX machines and their method of operation which will allow telephones and FAX machines to actively share a common telephone line with the ability for the telephone to employ an answering machine in conjunction therewith whereby both incoming FAX reception and incoming message recording can be accomplished in an unattended state.

Other objects and advantages of the present invention will become apparent from the description which follows hereinafter when taken in conjunction with the drawing figures which accompany it.

SUMMARY:

The foregoing objects have been achieved in a carrier signal-based electronic device by the improvement of the present invention for answering an incoming call over a single incoming telephone line connected thereto and for automatically switching the call between the carrier signal-based device and a telephone connected thereto as appropriate comprising, three position switch means having the telephone line connected to an input thereof for selectively connecting the telephone line to first, second and third output positions thereof, the switch means having the telephone operably connected to the second output position thereof and the carrier signal-based device connected to the third output position thereof; first logic means having an input connected to the first output position of the switch means and an output operably connected to switch the switch means between the first, second and third output positions for answering an incoming call on the telephone line, for determining whether the incoming call is from a carrier signal-based device, for switching the switch to connect the second output position when an incoming call from a non-carrier signal-based device is detected, and for switching the switch to connect the third output position when an incoming call from a carrier signal-based device is detected; and, second logic means having an input connected to sense transmissions from the telephone and the carrier signal-based device and an output operably connected to switch the switch means between the first, second and third output positions for switching the switch to the first position when a hang up by the telephone or the carrier signal-based device is detected.

In one version of the invention, the portion of the first logic means for determining whether the incoming call is from a carrier signal-based device comprises carrier signal-based calling devices including means for dialing a receiving device's number in a manner so as to cause a recognizable ring sequence at the receiving end and the first logic means including means for recognizing the recognizable ring sequence.

In another version, there are carrier signal generator means for generating a carrier signal and the portion of the first logic means for determining whether the incoming call is from a carrier signal-based device includes means for using the carrier signal generator means to transmit an appropriate burst of a the carrier signal sufficient to be interpreted by a transmitting device such as a carrier signal-based device and cause the transmitting device to attempt to "handshake" by transmitting its own carrier signal when an incoming ring is detected and means for detecting a return carrier signal in response to the burst of the carrier signal.

In an improved version, there are ring signal generator means for generating a ring signal and the portion of the first logic means for switching the switch to connect the second output position when an incoming call from a non-carrier signal-based device is detected and for switching the switch to connect the third output position when an incoming call from a carrier signal-based device is detected includes, means for applying a sequence of the ring signals from the ring signal generator means to the telephone and for detecting an answer thereof before switching the switch to connect the second output position when an incoming call from a non-carrier signal-based device is detected and means for applying a sequence of the ring signals from the ring signal generator means to the carrier signal-based device and for detecting a responding carrier signal therefrom before switching the switch to connect the second output position when an incoming call from a carrier signal-based device is detected.

In the preferred embodiment there are third logic means having an input connected to sense the connections to the telephone and the carrier signal-based device and an output operably connected to switch the switch means between the first, second and third output positions for switching the switch to the second position when a pick up by the telephone is detected and to the third position when a pick up by the carrier signal-based device is detected.

To provide improved telephone answering capability and unattended message recording, one embodiment additionally comprises, means for outputting a pre-recorded message; means for recording a message; and, means included within the first logic means operable when an incoming call is not from a carrier signal-based device for outputting the pre-recorded message, for ringing the telephone, for switching the switch to connect the second output position if the telephone is answered, and for turning on the means for recording a message if the telephone is not answered within a pre-established number of rings.

DESCRIPTION OF THE PREFERRED AND ALTERNATE EMBODIMENTS:

Before beginning the description of the present invention, it should be noted that while the description that follows is directed primarily to the combination of a FAX machine and a telephone sharing a common telephone line, the methods and apparatus described would be equally applicable to a computer with modem, or the like, sharing a common telephone line with a telephone line. Wherefore, it is the inventor's intent that the description and appended claims be accorded a breadth in keeping with the scope and spirit of the invention as disclosed herein despite the concentration on FAX machines in particular.

Figure 4:
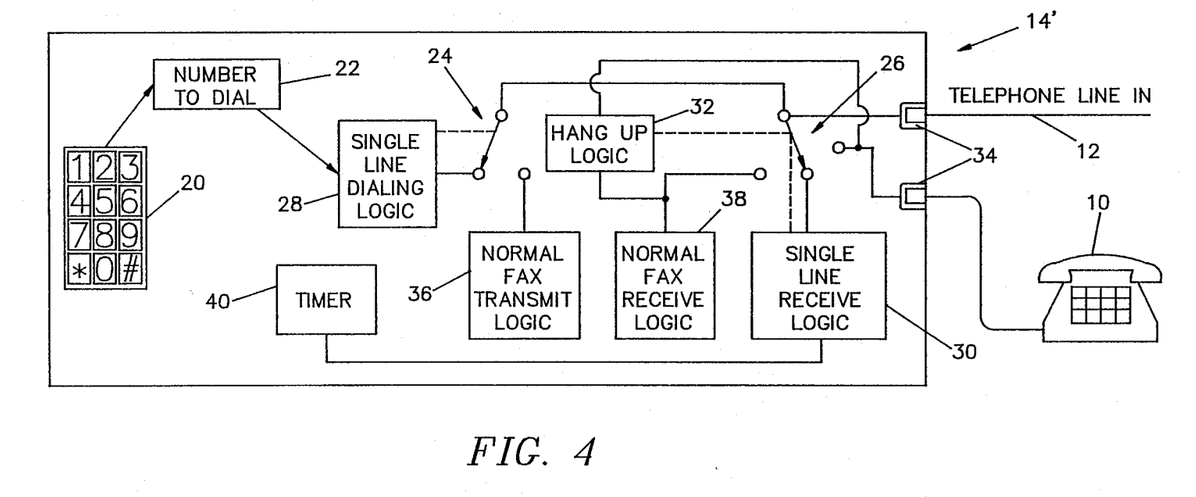
FIG. 4 is a functional block diagram of the present invention and its manner of allowing a facsimile machine and a telephone at a common site to be connected to a single incoming telephone line and automatically switching the proper device to an incoming call.

The present invention is based on the proposition that if the source of an incoming call can be determined (i.e. from a FAX machine or a telephone) the call can be switched to the proper device for handling it. According to the present invention, this can be accomplished in two ways. In the first, as accomplished by the FAX machine 14' of the present invention, as depicted in FIG. 4, the dial-out sequence of its transmit portion operates in a manner which allows a compatible FAX machine 14' on the receiving end to determine the originator of the call and handle it. By default, if the call is not from a compatible FAX machine 14', the call is assumed by the receiving FAX machine 14' to be from a telephone and is switched to the telephone 10 connected therethrough. In the second approach, which requires only the modification of the receiving machine (and is therefore preferred), the receiving machine responds momentarily as a FAX machine to see if the caller responds as a FAX machine (by sending a "handshake" request on a carrier frequency). If it does, normal FAX reception takes place. If not, a pseudo ring sequence is applied to the telephone. The way this is accomplished according to both approaches will now be described in greater detail. The non-preferred embodiment will be described first and then the preferred embodiment. Again, the preferred embodiment is preferred only because it can be accomplished at only the receiving end while the nonpreferred approach requires the cooperation of both the sending and receiving FAX machines.

As with most FAX machines, the single line compatible FAX machine 14' of the present invention in its first embodiment has a touch-tone input 20 whereby the telephone number of a destination FAX machine can be input by a user. The number is stored in a memory location 22. This too is usual in the prior art and not unique to the present invention. As can be seen from the drawing figure, the preferred FAX machine 14' has two electronic switches therein. The first is a two-position switch, generally indicated as 24, while the second is a three-position switch, generally indicated as 26. The operation of switch 24 is controlled by single line dialing logic 28. The operation of switch 26, on the other hand, is controlled by both single line receive logic 30 and hang up logic 32. As can be seen, the incoming telephone line 12 is connected through a plug receptacle 34 to the selector connections of the switches 24, 26. Switch 24 is used to connect the telephone line 12 to either the single line dialing logic 28 or the normal FAX transmit logic 36 in a manner to be described shortly. In similar manner, switch 26 is used to connect the telephone line 12 to either the single line receive logic 30, the telephone 10 (through a second plug receptacle 34), or the normal FAX receive logic 38 in a manner also to be described shortly. The hand up logic 32 is connected to sample the transmission over the telephone line 12 when connected to either the telephone 10 or the normal FAX receive logic 38 and to operate the switch 26 from the information received therefrom in a manner also now to be described.

Figure 5:
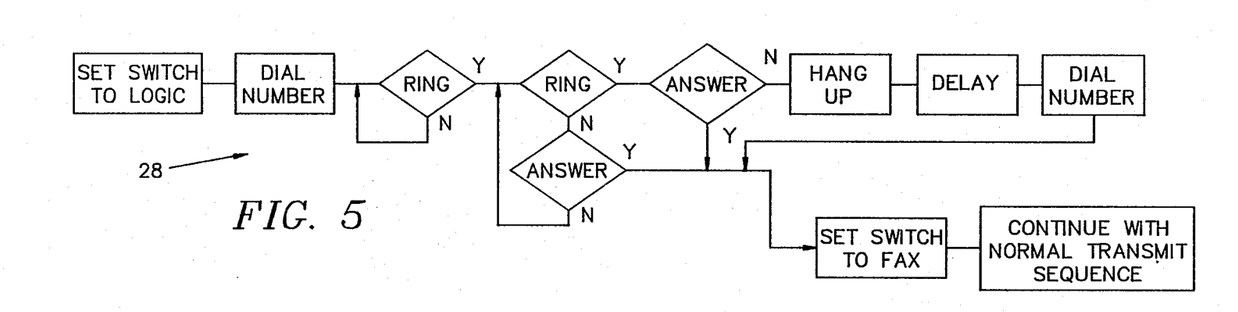
FIG. 5 is a logic flow diagram for the single line dialing logic of the present invention.

Turning first to FIG. 5, the logic of the single line dialing logic 28 whereby the sending single line compatible FAX machine 14' identifies itself will now be described. Upon entry from a "DIAL" request from the user, the logic 28 first switches the switch 24 to the position shown in FIG. 4 wherein the logic 28 is connected to the telephone line 12. In this regard, it should be noted in passing that the modem electronics whereby the FAX machine 14' communicates over the telephone line 12 is not shown for convenience, simplicity, and in the interest of avoiding redundancy. As those skilled in the art will appreciate, the switching and connections to the telephone line 12 shown and described herein will, of course, be accomplished through a modem. The logicl 28 first dials the number as stored in the memory location 22. It then waits for a ring at the receiving end to be indicated over the telephone line 12. Once the first ring has been detected, it then waits for either a second ring or an answer to be indicated over the telephone line 12. If there is an answer (either by receipt of a carrier signal or a voice), the logic 28 switches the the switch 24 to the position where the normal FAX transmit logic 36 is connected to the telephone line and transfers control to the normal FAX transmit logic 36. If there if no answer after the second ring, the logic 28 hangs up, delays briefly to assure a recognizable space between rings at the receiving end, redials the number, and then transfers control to that portion of the logic where the logic 28 switches the switch 24 to the position where the normal FAX transmit logic 36 is connected to the telephone line and transfers control to the normal FAX transmit logic 36 as described above.

Figures 6, 7:
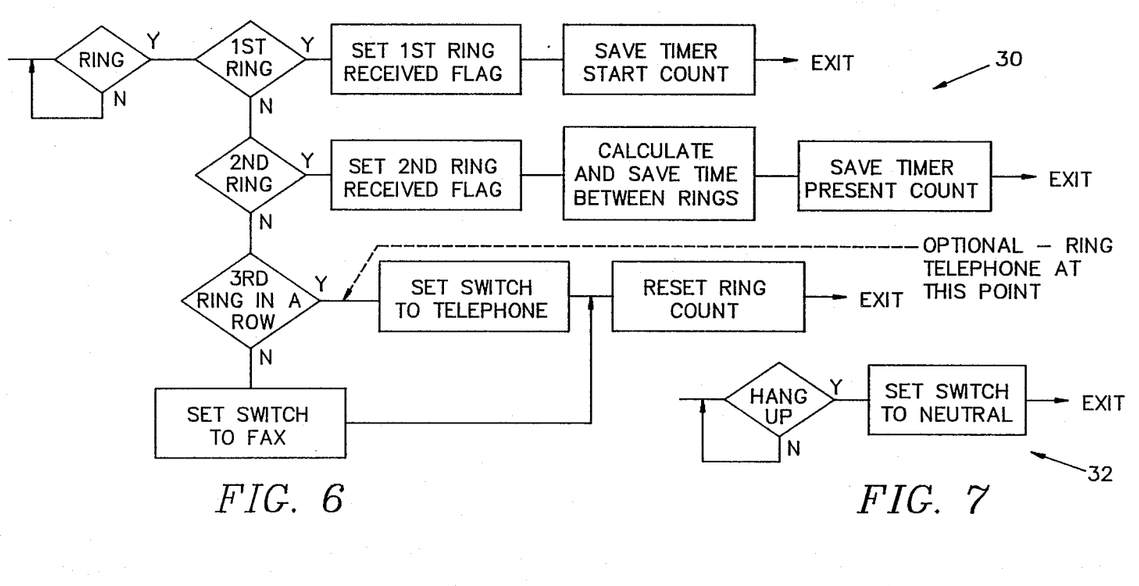
FIG. 6 is a logic flow diagram for the single line compatibility logic of the present invention.
FIG. 7 is a logic flow diagram for the hang up logic of the present invention.

Turning now to FIG. 6, the logic of the single line receive logic 30 is shown. The logic 30 begins with the switch 26 in its "neutral" position as shown in FIG. 4 wherein the logic 30 is connected to the telephone line 12. The logic 30 is begun upon the detection of an incoming ring signal on the telephone line 12. If it is a first ring, the logic 30 sets a "1st ring received" flag, save the present count of a running timer 40 (or resets to zero), and exits. If it is a second ring (i.e. the 1st ring received flag is set), the logic calculates and saves the time between ring from the timer 40, again saves the present count of the running timer 40, and exits. Upon receiving a third ring, the logic 30 determines if it is the third ring in a row or a delayed third ring (as from the dialing logic 28 of a single line compatible FAX machine 14' as described above). This is accomplished by checking whether or not the third ring occurred within the expected time following the second ring (prior saved count of the time 40 plus the calculated time between rings plus or minus a window value less than the delay introduced by the logic 28). If it is the third ring in a continuing sequence, the logic 30 assumes that it is not a single line compatible FAX machine 14' calling and switches the switch 26 to the telephone position wherein the telephone 10 is connected to the telephone line 12. If it is a delayed third ring, the logic 30 assumes that it is a single line compatible FAX machine 14' calling and switches the switch 26 to the FAX position wherein the normal FAX receive logic 38 is connected to the telephone line 12. In either case, the logic 30 resets its ring count before exiting. Either the telephone 10 or normal FAX receive logic 38 then responds to the following ring signals on the telephone line 12 in their usual manner. As depicted in FIG. 7, the hand up logic 32 merely monitors both devices and, when a "hang up" occurs at either device, sets the switch 26 back to its neutral position to await answering of the next incoming call by the single line compatibility logic 30 in the manner described above.

Figures 8, 9:
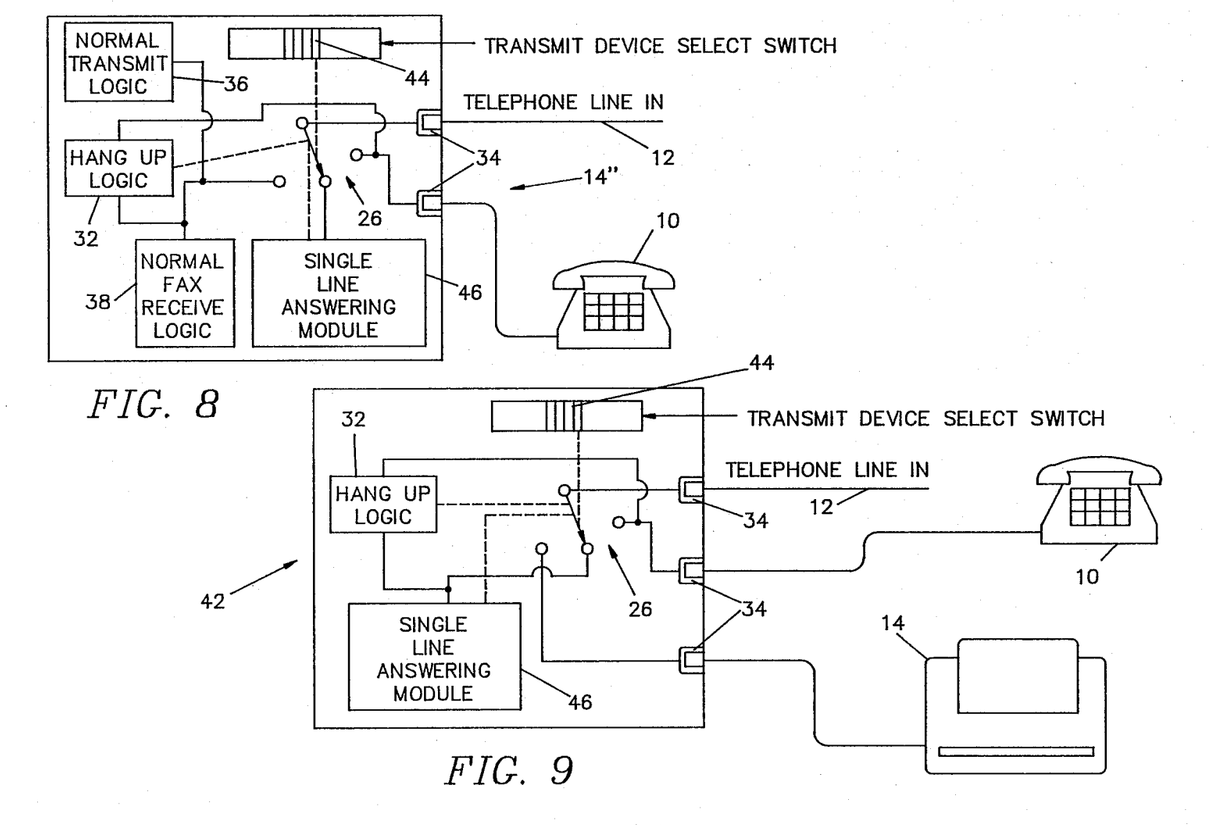
FIG. 8 is a functional block diagram showing the preferred embodiment of the present invention as incorporated into a FAX machine.
FIG. 9 is a functional block diagram showing an embodiment of the present invention as incorporated into a stand alone machine for answering a telephone line and automatically switching between a FAX machine and a telephone.

Turning now to FIGS. 8–11, the present invention in its basic preferred embodiment will now be described in detail. Since only the receiving end must be modified in this embodiment, it can be implemented in two ways—as part of a FAX machine 14", as depicted in FIG. 8, into which a telephone 10 is plugged, or as a stand alone answering and switching unit 42, as depicted in FIG. 9, into which both a telephone 10 and a standard FAX machine 14 can be plugged for simultaneous standby operation from a single telephone line. As those skilled in the art will readily recognize, the stand alone version could also be employed to connect a computer with modem, or the like, to a common telephone line with a telephone for the same purposes described in detail above.

Figures 10, 11:
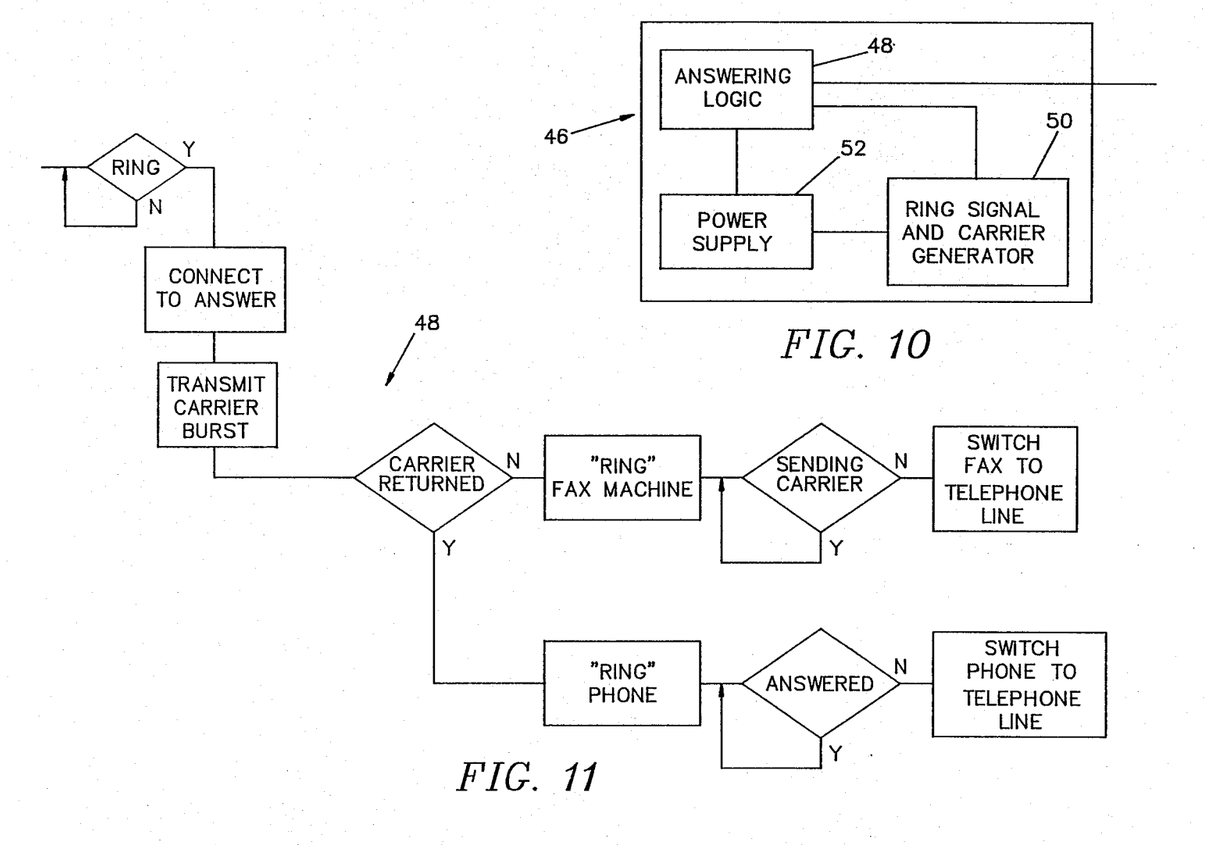
FIG. 10 is a block diagram of the single line answering module of the present invention.
FIG. 11 is a logic flow diagram for the logic of the present invention in its preferred embodiment.

With reference first to FIG. 8, the FAX machine 14" once again includes the normal FAX transmit and receive logic 36, 38 along with the three position electronic switch 26 having the incoming telephone line 12 connected through a plug receptacle 34 to the selector connection of the switch 26. Also present are the connections from the switch 26 to the telephone 10 and the hang up logic 32 connected to sense the devices when connected to the telephone line and to operate the switch 26 in the manner previously described with respect to the previous embodiment. Since there is no specialized dialing logic associated with this embodiment, a manual three position switch 44 is provided for manually forcing the switch 26 from its NEUTRAL to a FAX or TELEPHONE position for calling out (i.e. transmitting) with those devices. The single line answering module 46 includes the answering logic 48 and a ring/carrier signal generator 50 as shown in FIG. 10. When incorporated into a FAX machine 14", however, the power supply of the machine 14" (not shown) can be employed.

Turning to FIG. 9, it can be seen that the specialized structure of the stand alone answering and switching unit 42 is substantially the same as the FAX machine 14" described above. The only difference is that a third plug receptacle 34 is connected to the third position of the switch 26 so that a standard FAX machine can be connected thereto. Also, as alluded to above and as shown in FIG. 10, there must be a power supply 52 for driving the logic 48 and the ring/carrier signal generator 50.

The answering logic 48 of FIG. 11 is substantially the same for both the embodiments of FIG. 8 and FIG. 9 and only a generalized explanation thereof will be provided. Those skilled in the art will readily recognize the special provisions, and the like, which will be required to implement the logic in a particular embodiment. Similarly, although a FAX machine is employed as the example, as mentioned earlier herein, those skilled in the art will recognize that "computer modem", or the like, could be substituted in the text with equal applicability. When an incoming ring on the telephone line 12 is detected, the logic 48 first "answers" the call and uses the ring/carrier signal generator to transmit an appropriate burst of carrier signal sufficient to be interpreted by a transmitting device such as a FAX machine, computer modem, or such, as an answer by a similar device and cause the transmitting device to attempt to "handshake" by transmitting its own carrier signal. If the logic 48 detects a return carrier signal in response to its burst of self-generated carrier, it knows that it is connected to a FAX machine. In such case, it employs the ring/carrier signal generator to apply a sequence of standard telephone ring signals to the telephone line into the FAX machine 14 attached thereto (internally or externally). The logic 48 waits until it detects a carrier signal from the FAX machine. At that point in time, the attached FAX machine and calling FAX machine are in logical synchronization, i.e. the calling FAX machine thinks it received the initiating answering carrier signal from the attached FAX machine and is transmitting a handshake return signal. The logic 48, therefore, need only switch the switch 26 to its FAX position to connect the attached FAX machine to the telephone line and allow the two FAX's to proceed in their normal manner.

If a carrier is not returned in response to the burst sent by the logic 48, it is assumed that a voice caller is calling for a telephone response. In such case, the logic 48 again employs the ring/carrier signal generator 50 to provide a ring signal which is applied to the telephone line into the telephone 10 causing it to ring locally. When an answer is detected, the logic 48 switches the switch 26 to its TELEPHONE position to connect the attached telephone 10 to the telephone line and allow conversation to proceed in its normal manner. Note that the "answer" could have been by an answering machine employed with the telephone 10 in its usual manner. This aspect is transparent to the present invention—as it should be. Since the calling party has had his or her call "answered", no longer hears ringing, and has, possibly, heard the short burst of carrier from the answering module 46, certain options are possible that might be desirable in an actual implementation for "cosmetic" purposes. For example, a pseudo ring signal could be applied to the telephone line 12 by the logic 48 prior to switching the switch 26 to indicate to the calling party that the telephone had not been answered yet.

Figure 12:
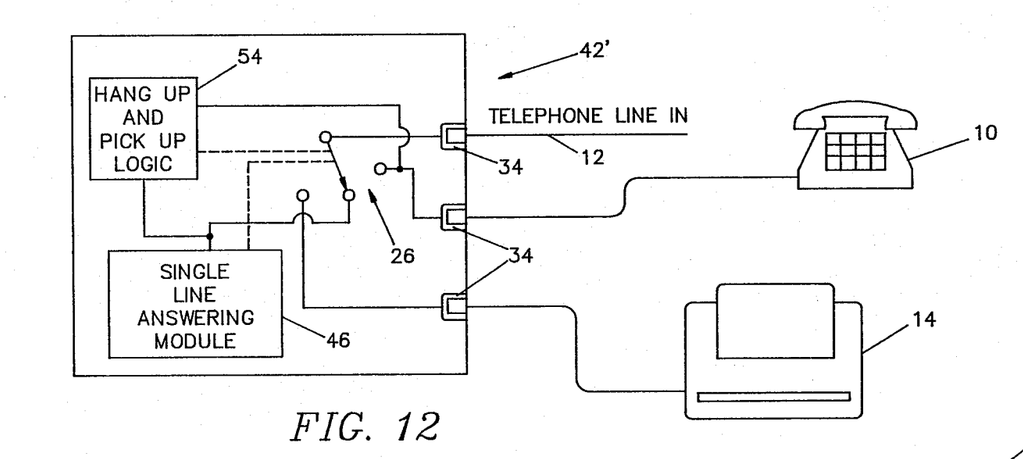
FIG. 12 is a functional block diagram showing an embodiment of the present invention as incorporated into a stand alone machine for answering a telephone line and automatically switching between a FAX machine and a telephone and for switching the FAX machine and telephone to the telephone line when they attempt to transmit.
Figure 13:
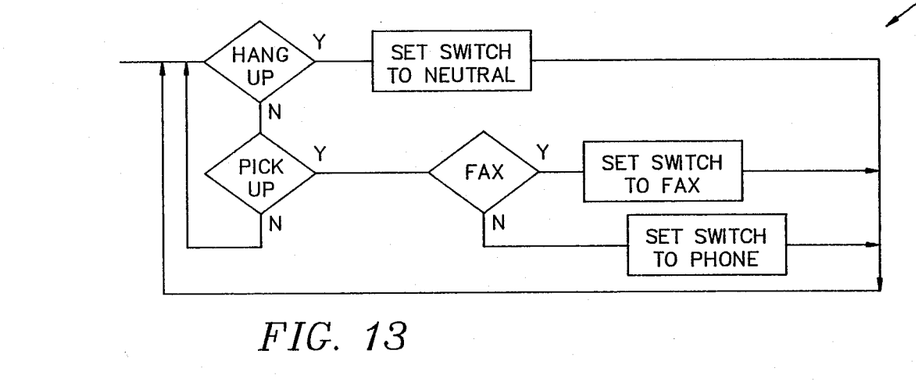
FIG. 13 is a flow chart of the hang up and pick up logic of the embodiment of FIG. 12.

As shown by the drawings of FIGS. 12 and 13, it is preferred that the manual select switch 44 be replaced by automatic operation when transmission is desired. To this end, in the preferred approach the hang up logic 32 is replaced with hang up and pick up logic 54. As shown by the very simplified logic flowchart of FIG. 13, in addition to monitoring for a hang up condition wherein the switch 26 is returned to its neutral position, when the telephone 10 and FAX machine 14 are not in use, the logic 54 monitors the lines connected thereto to sense if there is a "pick up" of the handset of the telephone 10 or its equivalent in the FAX machine 14 indicating a desire by a user to use the device for an outgoing call. When such desire is indicated, the logic 54 automatically connects the proper device to the telephone line 12 by moving the switch 26 to the proper position. While not shown in the simplified flowchart of FIG. 13, the logic 54 would, of course stop looking for a pickup until after a hangup was detected.

Figure 14:
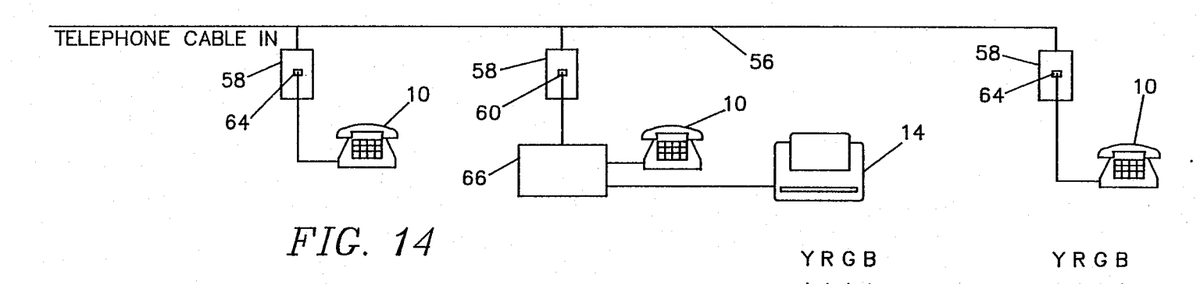
FIG. 14 is a simplified drawing showing the way the present invention acts as a branching point when employed in an environment where more than one telephone is hooked to the telephone line.
Figure 15:
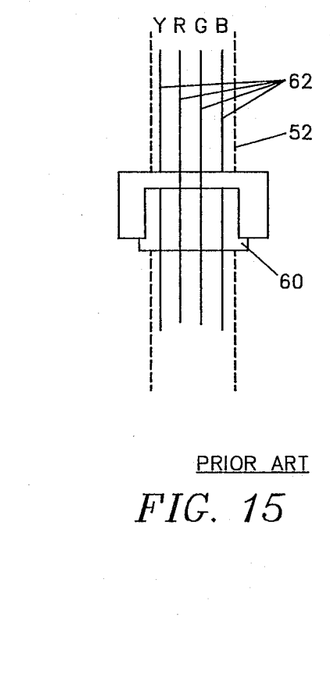
FIG. 15 is a simplified drawing showing the prior art use of a terminating plug into a wall receptacle, or the like, to make connection to two of the four wires contained in the telephone cable typically employed for "home" wiring.
Figure 16:
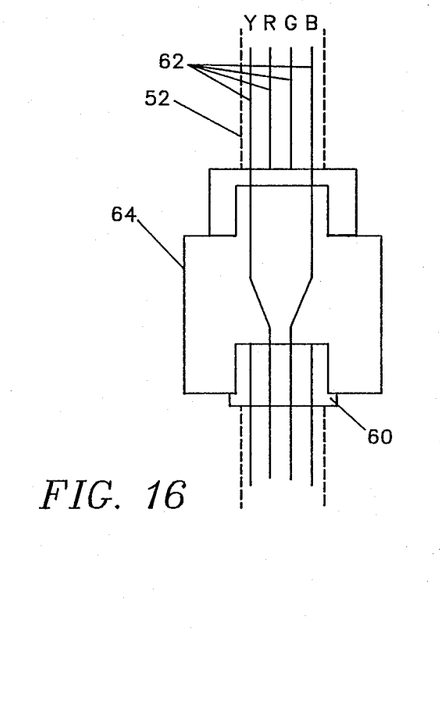
FIG. 16 is a simplified drawing in the manner of FIG. 15 showing the plug adapter of the present invention employed to switch the telephones of the system to receive their signals over the unused two wires of the typical telephone cable.
Figures 17, 18:
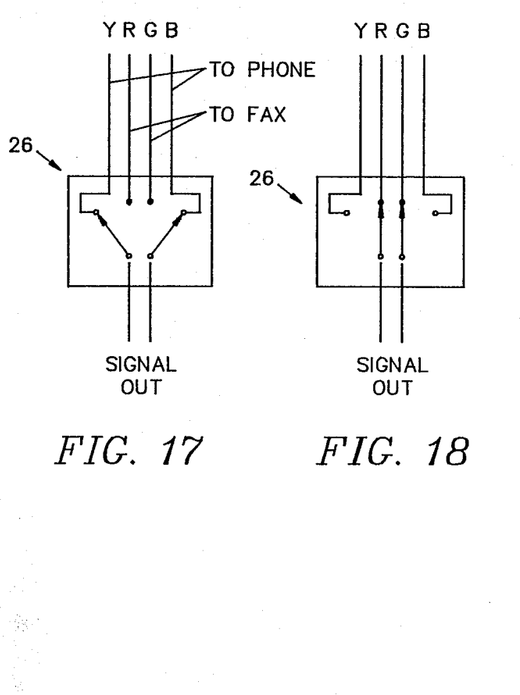
FIG. 17 is a simplified drawing showing the switching of the present invention when connecting a plurality of telephones to the telephone line.
FIG. 18 is a simplified drawing in the manner of FIG. 17 showing the switching of the present invention when connecting the FAX machine to the telephone line.

Another important aspect of the present invention is shown in FIGS. 14–18. In most telephone installations, there is more than one telephone 10 connected to the telephone line 12. As depicted in FIG. 14, typically there is a telephone cable 56 which enters the building having a plurality of outlets 58 connected thereto in parallel. The telephones 10 are plugged into the outlets 58 with miniature plugs 60 which have become a standard article in the telephone industry. The standard cable 56 typically employed in most homes and small offices contains four wires 62 having red, green, yellow and black insulation, respectively. The standard telephone, however, employs only the red and green wires as the so-called "tip" and "ring" pair. Thus, a shown in FIG. 15, the plug 60, in many cases, only connects the red and green wires 62. Thus, in the present invention when it is desired to control more than one telephone, the adapter plug 64 of FIG. 16 is employed and the previously described switching takes place as shown in FIGS. 17 and 18. The telephone at one of the outlets 58 is unplugged and the control unit 66 of the present invention is plugged therein in the usual manner with a plug 60 connected to all four of the wires 62 in the cable 56. Each of the remaining telephones 10 is plugged into its outlet through an adapter plug 64 of the type shown in FIG. 16 which causes the telephones to be connected in parallel to the unused black and yellow wires 62. As depicted in FIG. 17, when the control unit 66 of the present invention desires to connect the telephones 10 to the telephone line 12, the switching function of switch 26 operates to connect the signal on the red and green wires 62 to the yellow and black wires 62. On the other hand, as depicted in FIG. 18, when the control unit 66 of the present invention desires to connect the FAX machine 14 to the telephone line 12, the switching function of switch 26 operates to connect the signal on the red and green wires 62 to the red and green wires 62 connected to the FAX machine 14.

Figure 19:
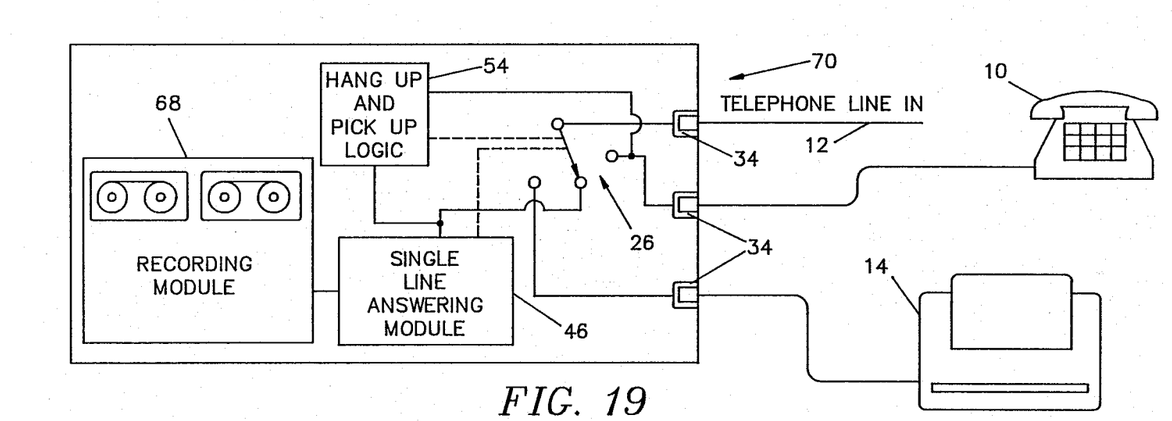
FIG. 19 is a functional block diagram showing the preferred embodiment of the present invention employed in combination with a telephone answering module to produce synergistic results.
Figure 20:
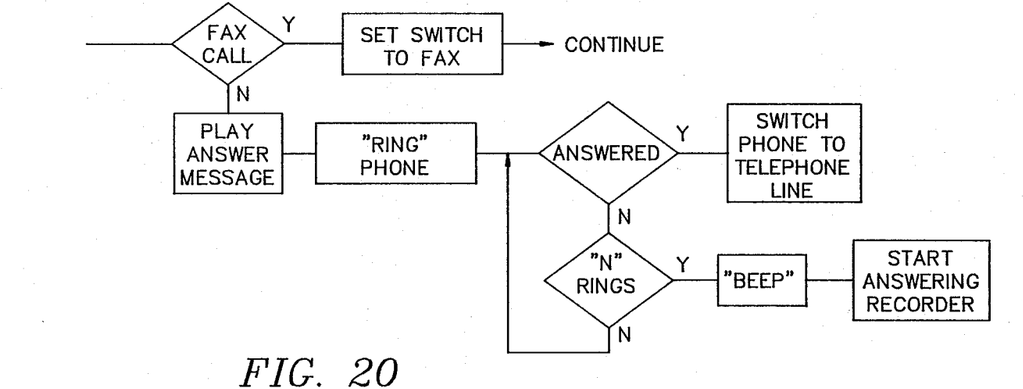
FIG. 20 is a flowchart of the additional logic for answering the telephone employed with the combined device of FIG. 19.

As depicted in FIGS. 19 and 20, the present invention could also be combined with a recording module 68 to provide an improved telephone answering machine 70 which could provide a pre-recorded message announcing that it was a dual function device, that is had determined that an individual was calling, and that if the called party did not answer, a message could be left following the signal. To accomplish this, the answering logic is modified as shown in FIG. 20. When the logic finds that it is not a FAX call in, i.e. it is a telephone incoming call, it first plays the pre-recorded, above-described message with the recording module 68. It then rings the telephone 10 and switches the switch 26 to the phone position if there is an answer. If there is no answer after "N" rings (as with the normal telephone answering machine) it gives the caller a "beep" and starts the message recording function of the recording module 68.

Thus, it can be seen that the present invention has met its stated objectives by providing several alternatives to the problem of having two devices share a single telephone line in unattended operation.

Wherefore, having thus described the present invention, what is claimed is:

1. Apparatus for answering an incoming call over a single telephone line and for automatically switching the call between a telephone and a carrier signal-based device as appropriate comprising:
   (a) three position switch means for switching a telephone line connected thereto between first, second and third output positions thereof, said switch means having the telephone operably connected to said second output position thereof and the carrier signal-based device connected to said third output position thereof;
   (b) first logic means having an input connected to said first output position of said switch means and an output operably connected to switch said switch means between said first, second and third output positions for answering an incoming call on said telephone line, for determining whether said incoming call is from a carrier signal-based device, for switching said switch means to connect said second output position when an incoming call from a non-carrier signal-based device is detected, and for switching said switch means to connect said third output position when an incoming call from a carrier signal-based device is detected; and,
   (c) second logic means having an input connected to sense transmissions from the telephone and the carrier signal-based device and an output operably connected to switch said switch means between said first, second and third output positions for switching said switch means to said first position when a hang up by the telephone or the carrier signal-based device is detected.

2. The answering and switching apparatus of claim 1 wherein a portion of said first logic means for determining whether said incoming call is from a carrier signal-based device comprises:
   (a) carrier signal-based calling devices including means for dialing a receiving device's number in a manner so as to cause a recognizable ring sequence at the receiving end; and,
   (b) said first logic means includes means for recognizing said recognizable ring sequence.

3. The answering and switching apparatus of claim 1 and additionally comprising:
   (a) carrier signal generator means for generating a carrier signal; and wherein a portion of said first logic means for determining whether said incoming call is from a carrier signal-based device includes,
   (b) means for using said carrier signal generator means to transmit an appropriate burst of said carrier signal sufficient to be interpreted by a transmitting device as a carrier signal-based device and cause the transmitting device to attempt to "handshake" by transmitting its own carrier signal when an incoming ring is detected; and,
   (c) means for detecting a return carrier signal in response to said burst of said carrier signal.

4. The answering and switching apparatus of claim 1 and additionally comprising:
   (a) ring signal generator means for generating ring signals; and wherein a portion of said first logic means for switching said switch means to connect said second output position when an incoming call from a non-carrier signal-based device is detected, and for switching said switch means to connect said third output position when an incoming call from a carrier signal-based device is detected includes,
   (b) means for applying a sequence of said ring signals from said ring signal generator means to the telephone and for detecting an answer thereof before switching said switch means to connect said second output position when an incoming call from a non-carrier signal-based device is detected; and,
   (c) means for applying a sequence of said ring signals from said ring signal generator means to the carrier signal-based device and for detecting a responding carrier signal therefrom before switching said switch means to connect said second output position when an incoming call from a carrier signal-based device is detected.

5. The answering and switching apparatus of claim 1 and additionally comprising:

third logic means having an input connected to sense the connections to the telephone and the carrier signal-based device and an output operably connected to switch said switch means between said first, second and third output positions for switching said switch means to said second position when a pick up by the telephone is detected and to said third position when a pick up by the carrier signal-based device is detected.

6. The answering and switching apparatus of claim 1 and additionally comprising:
   (a) means for outputting a pre-recorded message;
   (b) means for recording a message; and,
   (c) means included within said first logic means operable when an incoming call is not from a carrier signal-based device, for outputting said pre-recorded message, for ringing the telephone, for switching said switch means to connect said second output position if the telephone is answered, and for turning on said means for recording a message if the telephone is not answered within a pre-established number of rings.

7. In a carrier signal-based electronic device the improvement for answering an incoming call over a single incoming telephone line connected thereto and for automatically switching the call between the carrier signal-based device and a telephone connected thereto as appropriate comprising:
   (a) three position switch means having the telephone line connected to an input thereof for selectively connecting the telephone line to first, second and third output positions thereof, said switch means having the telephone operably connected to said second output position thereof and the carrier signal-based device connected to said third output position thereof;
   (b) first logic means having an input connected to said first output position of said switch means and an output operably connected to switch said switch means between said first, second and third output positions for answering an incoming call on said telephone line, for determining whether said incoming call is from a carrier signal-based device, for switching said switch means to connect said second output position when an incoming call from a non-carrier signal-based device is detected, and for switching said switch means to connect said third output position when an incoming call from a carrier signal-based device is detected; and,
   (c) second logic means having an input connected to sense transmissions from the telephone and the carrier signal-based device and an output operably connected to switch said switch means between said first, second and third output positions for switching said switch means to said first position when a hang up by the telephone or the carrier signal-based device is detected.

8. The improvement to a carrier signal-based device of claim 7 wherein the portion of said first logic means for determining whether said incoming call is from a carrier signal-based device comprises:
   (a) carrier signal-based calling devices including means for dialing a receiving device's number in a manner so as to cause a recognizable ring sequence at the receiving end; and,
   (b) said first logic means includes means for recognizing said recognizable ring sequence.

9. The improvement to a carrier signal-based device of claim 7 and additionally comprising:
   (a) carrier signal generator means for generating a carrier signal; and wherein a portion of said first logic means for determining whether said incoming call is from a carrier signal-based device includes,
   (b) means for using said carrier signal generator means to transmit an appropriate burst of said carrier signal sufficient to be interpreted by a transmitting device such as a carrier signal-based device and cause the transmitting device to attempt to "handshake" by transmitting its own carrier signal when an incoming ring is detected; and,
   (c) means for detecting a return carrier signal in response to said burst of said carrier signal.

10. The improvement to a carrier signal-based device of claim 7 and additionally comprising:
    (a) ring signal generator means for generating ring signals; and wherein a portion of said first logic means for switching said switch means to connect said second output position when an incoming call from a non-carrier signal-based device is detected, and for switching said switch means to connect said third output position when an incoming call from a carrier signal-based device is detected includes,
    (b) means for applying a sequence of said ring signals from said ring signal generator means to the telephone and for detecting an answer thereof before switching said switch means to connect said second output position when an incoming call from a non-carrier signal-based device is detected; and,
    (c) means for applying a sequence of said ring signals from said ring signal generator means to the carrier signal-based device and for detecting a responding carrier signal therefrom before switching said switch means to connect said second output position when an incoming call from a carrier signal-based device is detected.

11. The improvement of claim 7 and additionally comprising:
    third logic means having an input connected to sense the connections to the telephone and the carrier signal-based device and an output operably connected to switch said switch means between said first, second and third output positions for switching said switch means to said second position when a pick up by the telephone is detected and to said third position when a pick up by the carrier signal-based device is detected.

12. The improvement of claim 7 and additionally comprising:
    (a) means for outputting a pre-recorded message;
    (b) means for recording a message; and,
    (c) means included within said first logic means operable when an incoming call is not from a carrier signal-based device for outputting said pre-recorded message, for ringing the telephone, for switching said switch means to connect said second output position if the telephone is answered, and for turning on said means for recording a message if the telephone is not answered within a pre-established number of rings.

13. The method of constructing and operating a FAX machine and a telephone for unattended transmission reception from a common telephone line comprising the steps of:

(a) providing three position switch means for selectively connecting an input thereof to first, second and third output positions thereof;
(b) connecting the telephone line to the input of said switch means;
(c) connecting the telephone to the second output position of said switch means;
(d) connecting the FAX machine to the third output position of said switch means;
(e) for each incoming call on the telephone line,
  (e1) answering the call;
  (e2) determining whether the incoming call is from a carrier signal-based device;
  (e3) switching the switch means to connect the second output position when an incoming call from a non-carrier signal-based device is detected;
  (e4) switching the switch means to connect the third output position when an incoming call from a carrier signal-based device is detected; and,
  (e5) switching the switch means to the first position when a hang up by the telephone or the carrier signal-based device is detected.

14. The method of claim 13 wherein said step of determining whether the incoming call is from a carrier signal-based device includes the steps of:
(a) including means for dialing a receiving device's number in a manner so as to cause a recognizable ring sequence at the receiving end in carrier signal-based calling devices; and,
(b) recognizing the recognizable ring sequence to determine that the incoming call is from a carrier signal-based device.

15. The method of claim 13 wherein said step of determining whether the incoming call is from a carrier signal-based device includes the steps of:
(a) generating and transmitting an appropriate burst of a carrier signal sufficient to be interpreted by a transmitting device as a carrier signal-based device and cause the transmitting device to attempt to "handshake" by transmitting its own carrier signal when an incoming ring is detected; and,
(d) detecting a return carrier signal in response to the burst of the carrier signal to determine that the incoming call is from a carrier signal-based device.

16. The method of claim 13 and additionally comprising the steps of:
(a) applying a sequence of ring signals to the telephone and detecting an answer thereof before switching the switch means to connect the second output position when an incoming call from a non-carrier signal-based device is detected; and,
(c) applying a sequence of the ring signals to the carrier signal-based device and detecting a responding carrier signal therefrom before switching the switch means to connect the second output position when an incoming call from a carrier signal-based device is detected.

17. The method of claim 13 and additionally comprising the steps of:
(a) sensing the connections to the telephone and the carrier signal-based device;
(b) switching the switch means to connect the second output position when a pick up by the telephone is detected; and,
(c) switching the switch means to connect the third output position when a pick up by the carrier signal-based device is detected.

18. The method of claim 13 and additionally comprising the steps of:
(a) providing means for outputting a pre-recorded message;
(b) providing means for recording a message; and,
(c) when an incoming call is not from a carrier signal-based device,
  (c1) outputting the pre-recorded message;
  (c2) ringing the telephone;
  (c3) switching the switch means to connect the second output position if the telephone is answered; and,
  (c4) turning on the means for recording a message if the telephone is not answered within a preestablished number of rings.

19. The answering and switching apparatus of claim 1 wherein said telephone line includes a first and a second pair of conductors with an active telephone tip and ring connected to said first pair of conductors and additionally comprising:
branching means operably connected to said three position switch means for connecting one of said second and third output positions thereof to the telephone or carrier signal-based device connected thereto through said second pair of conductors.

20. Switching apparatus for answering an incoming call from a single telephone line which includes a first and a second pair of conductors with an active telephone tip and ring connected to said first pair of conductors and for automatically switching the call between a telephone and a carrier signal-based device as appropriate comprising:
(a) three position switch means for switching a telephone line connected thereto between first, second and third output positions thereof, said switch means having a pair of first conductors connected to said second output position thereof and a pair of second conductors connected to said third output position thereof, the carrier signal-based device being connected to said output position thereof through said pair of second conductors;
(b) branching means for operably connecting tip and ring wires of the telephone to said second output position through said pair of first conductors;
(c) first logic means having an input connected to said first output position of said switch means and an output operably connected to switch said switch means between said first, second and third output positions for answering an incoming call on said telephone line, for determining whether said incoming call is from a carrier signal-based device, for switching said switch means to connect said second output position when an incoming call from a non-carrier signal-based device is detected, and for switching said switch means to connect said third output position when an incoming call from a carrier signal-based device is detected; and,
(d) second logic means having an input connected to sense transmissions from the telephone and the carrier signal-based device and an output operably connected to switch said switch means between said first, second and third output positions for switching said switch means to said first position when a hang up by the telephone or the carrier signal-based device is detected whereby operation of the telephone and the carrier signal-based device over the signal telephone line for both incoming and outgoing calls is transparent to a user.

21. The switching apparatus of claim 20 wherein there are a plurality of telephones connected in parallel through respective plugs and sockets to a common cable which includes a first and a second pair of conductors with an active telephone tip and ring normally connected to said first pair of conductors and wherein said branching means comprises:
   (a) a first Y-brancher disposed adjacent the switching apparatus for connecting said second output position to said second pair of conductors of said common cable; and,
   (b) a plurality of second Y-branchers disposed at respective ones of said sockets for receiving a plug of a telephone associated therewith and for connecting said first pair of conductors of said common cable to said tip and ring wires of the telephone.

22. Switching apparatus for answering an incoming call from a single telephone line which includes a first and a second pair of conductors with an active telephone tip and ring connected to said first pair of conductors and for automatically switching the call between a telephone and a carrier signal-based device as appropriate comprising:
   (a) switch means for switching telephone line connected thereto between first and second output positions thereof, said switch means having a pair of first conductors connected to said first output position thereof and a pair of second conductors connected to said second output position thereof, the carrier signal-based device being connected to said second output position thereof through said pair of second conductors;
   (b) branching means for operably connecting tip and ring wires of the telephone to said first output position through said pair of first conductors; and,
   (c) first logic means having an output operably connected to switch said switch means between said first and second output positions for answering an incoming call on said telephone line, for determining whether said incoming call is from a carrier signal-based device, for switching said switch means to connect said first output position when an incoming call from a non-carrier signal-based device is detected, and for switching said switch means to connect said second output position when an incoming call from a carrier signal-based device is detected.

23. The switching apparatus of claim 22 and additionally comprising:
   second logic means having an input connected to sense transmissions from the telephone and the carrier signal-based device and an output operably connected to switch said switch means between said first and second output positions for switching said switch means to said first position when a pick up by the telephone is detected and to said second position when a pick up by the carrier signal-based device is detected whereby operation of the telephone and the carrier signal-based device over the single telephone line for both incoming and outgoing calls is transparent to a user.

24. The switching apparatus of claim 22 wherein there are a plurality of telephones connected in parallel through respective plugs and sockets to a common cable which includes a first and a second pair of conductors with an active telephone tip and ring normally connected to said first pair of conductors and wherein said branching means comprises:
   (a) a first Y-brancher disposed adjacent the switching apparatus for connecting said second output position to said second pair of conductors of said common cable; and,
   (b) a plurality of second Y-branchers disposed at respective ones of said sockets for receiving a plug of a telephone associated therewith and for connecting said first pair of conductors of said common cable to said tip and ring wires of the telephone.

* * * * *